Figure 1:
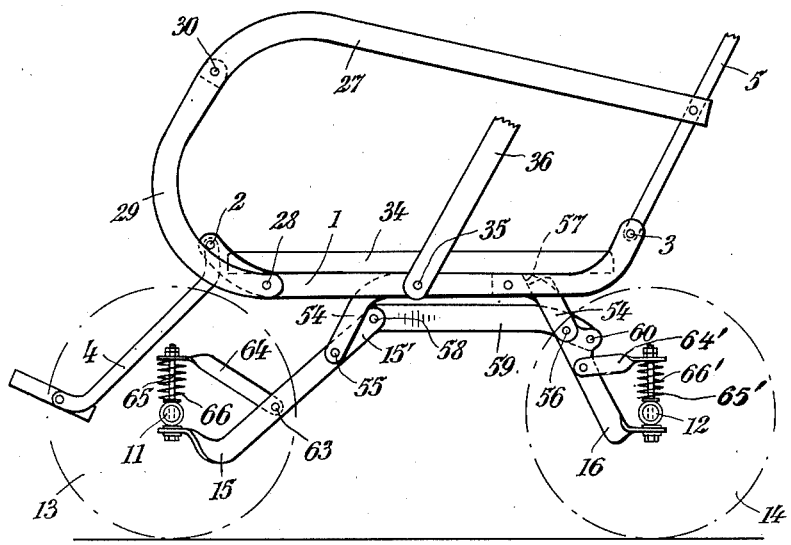

May 26, 1953 H. MIKLOS 2,639,925
BABY CARRIAGE OR THE LIKE HAVING INDIVIDUALLY
ROCKABLY SUPPORTED AXLES
Filed Feb. 3, 1950 2 Sheets-Sheet 1

INVENTOR.
HEINRICH MIKLOS
BY K. B. Mayr
ATTORNEY.

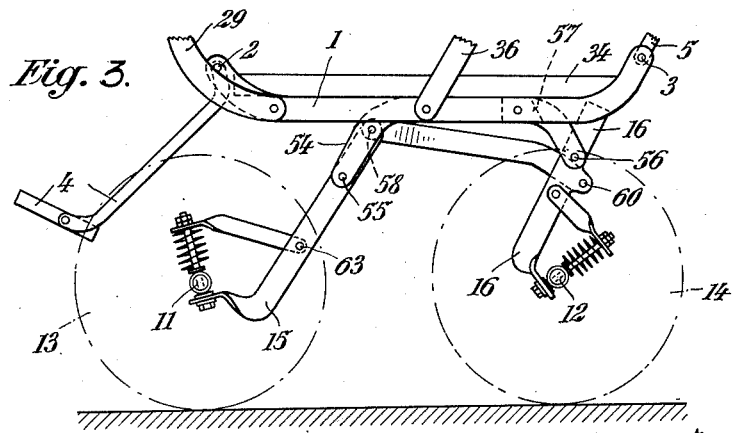
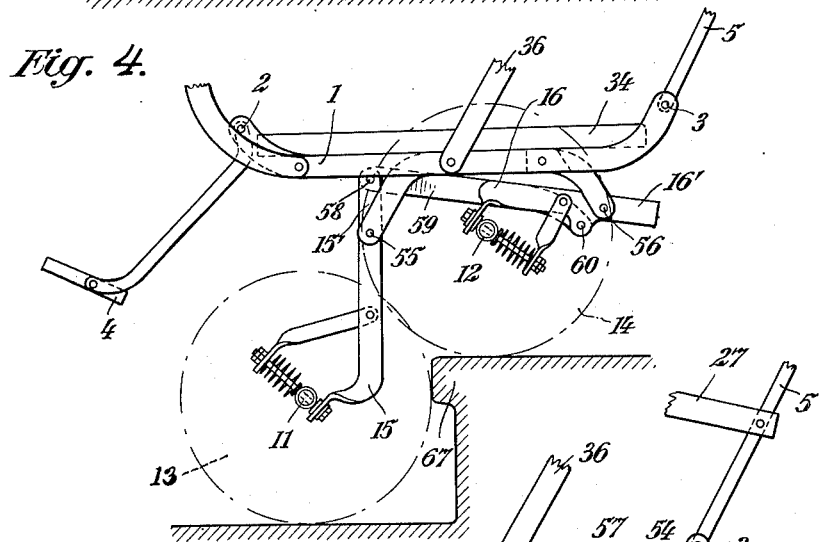
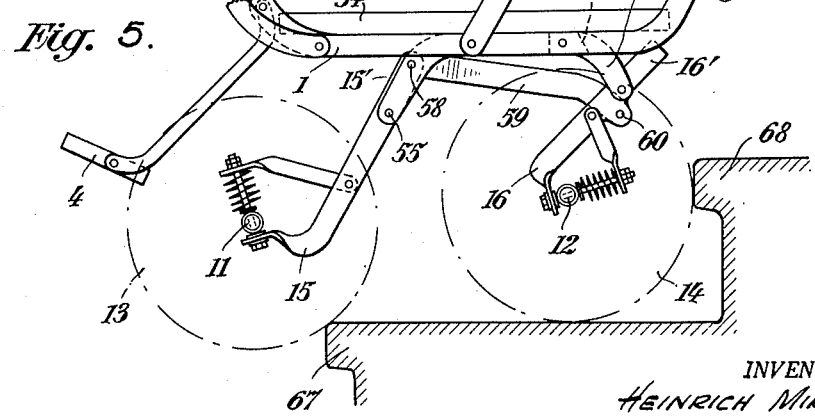

Patented May 26, 1953

2,639,925

UNITED STATES PATENT OFFICE 2,639,925

BABY CARRIAGE OR THE LIKE HAVING INDIVIDUALLY ROCKABLY SUPPORTED AXLES

Heinrich Miklos, Vienna, Austria, assignor to AVE Transportmittel Holding A. G., St. Moritz, Switzerland, a firm Application February 3, 1950, Serial No. 142,128
In Austria February 23, 1949

6 Claims. (Cl. 280—5.28)

The present invention relates to baby carriages or the like having individually rockably supported axles for facilitating moving up and down curbstones and stairs.

Baby carriages are known which are provided with a device for facilitating the movement down and up the curbs when crossing from one side of a street to the other and for avoiding any change in the position of the carriage body, which remains horizontal. For this purpose each axle is supported on a pair of guides, each of which has a guide slot co-operating with a stud fixed on the carriage frame, and is linked at its free end to a lever which is supported by the carriage frame. This lever, being spring-loaded, urges the wheels toward the road. When a street is being crossed a system of rods extending from the push bar of the carriage is actuated whereby a locking arrangement provided for moving on a level surface is released and at the same time an auxiliary wheel, which is co-ordinated with each axle and mounted on a pivoted lever in the center plane of the carriage, is swung toward the road. This arrangement is most complicated and is unsuitable for passing over several successive steps, for example, a staircase.

Baby carriages have also been suggested in which the carriage body consists of two parts so that a baby carriage may be converted into a stroller. In this case, in order to be able to respond to the dislocation of the center of gravity of the carriage, the axles consist of crank-like levers, which can be swung through 180 deg. and are held in their respective extreme positions by tension springs.

It is the object of the present invention to provide a baby carriage which can be conveniently moved over stairs.

The essential feature of the invention resides in the fact that at least one of the axles forms together with its support arms or levers a U-shaped member which is pivoted to the carriage frame and which, when moving up and down a stairway, can be swung toward the other axle in order to shorten the wheelbase. According to a modified construction the U-shaped members, pivotally movable about a fixed pin of the carriage frame, are positively connected with each other to perform essentially opposite pivotal movements. In a simple construction according to the invention, at least one support lever of one wheel axle extends upward beyond its pivot pin and is fulcrumed to one end of a link member whose other end is articulated to the support lever of the other wheel axle below the pivot pin of the second support lever.

Figure 2:
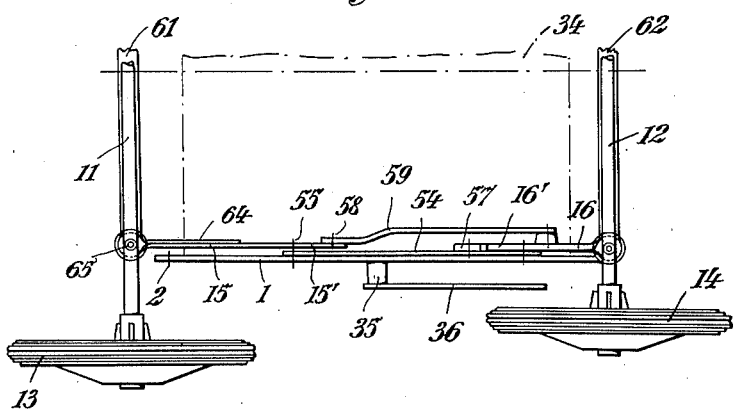

In the drawing the invention is shown by way of example, Fig. 1 showing a side view of the baby carriage according to the invention and Fig. 2 being a top view of one half of the undercarriage of the carriage shown in Fig. 1 and having the seat removed, the other half being like the one shown in Fig. 2. Figs. 3 to 5 show side views of the carriage in various positions for and during going over a staircase.

Like parts are designated by like numerals in all figures of the drawing.

The carriage framework consists essentially of a frame, whose longitudinal members 1 are slightly bent upward at their ends and have pivot pins 2, 3 for a foot rest 4 and for a back rest 5, respectively. The lateral uprights of back rest 5 are pivoted to arm rests 27 whose forward ends are connected by pivots 30 with curved members 29, the latter being connected with the longitudinal members 1 by pivots 28. Members 1 support a bottom plate 34.

A bracket member 54 is mounted on the inside of each of the longitudinal members 1 (Figs. 1 and 2). The downwardly-bent ends of members 54 carry pivot pins 55 and 56, the pins 55 at the front ends, and the pins 56 at the rear ends, respectively, being coaxial. The pins serve for pivotally mounting support levers 15 and 16 for the axles 11 and 12, for the front and rear wheels 13 and 14, respectively. The support levers 15 and 16 extend upward beyond their pivot pins. The upward extensions 16' of levers 16 abut in the position shown in Fig. 1 against abutments 57 on the members 54 (Fig. 2) so that the U-shaped part formed by the support levers 16 and the rear axle 12 cannot be moved counter-clockwise beyond the position shown in Fig. 1. The upward extensions 15' of levers 15 have at their ends pivot pins 58 for connecting link members 59, which are articulated at 60, below pivot pins 56, to the support levers 16. The arrangement is such that the distance of the pivot pin 58 from the pin 55 is about twice that of the pivot pin 60 from the pin 56 and that a straight line extending diametrically through the bolts 58 and 55 encloses an angle of about 120 deg. with a straight line extending diametrically through pivots 60 and 56, when the carrier arms 15 and 16 are in the position for movement of the carriage on level ground (Fig. 1). The lower ends of the support arms 15, 16, which are made of strip steel, are twisted through 90 deg. in respect of their pivotal plane and are connected in pairs below the axles 11 and 12, respectively, by transverse rods 61, 62, respectively. Forwardly and upwardly extending arms 64 are connected at 63 to the front support levers 15. A bolt 65 extends from the lower end of each of the arms 15, extends slidably through the front axle 11, and has its upper end connected with an arm 64. A helical compression spring 66, which is concentric with the upright bolt 65, is provided between the axle 11 and the arm 64. The rear axle is cushioned in the same manner, as shown in the drawing, a coil spring 66' being placed around a bolt 65' between the axle 12 and the free end of the rearwardly extending arm 64'. A push bar is connected in the conventional manner at opposite points 35 with each of the longitudinal members 1 of the frame and can be swung on pivots 35 or locked in position, if desired.

When moving over a level surface the axles 11 and 12 with their wheels 13, 14 are in the position shown in Fig. 1 and are secured in this position by the abutments 57 so that the axles cannot move farther apart beyond this position under the weight or load of the carriage, which load is taken up by the springs 66 and 66'. For movement over stairs the rear axle 12 is moved from the position according to Fig. 1 to that according to Fig. 3, which movement is effected by a slight lift of the rear part of the carriage with the front wheels 13 on the ground, and by a simultaneous forward movement of the axle 12 together with wheels 14, which movement is effected by means of the foot. Hereby the link member 59 is moved forward to a certain extent. At the same time the levers 15 are placed at a less acute angle to the ground so that the carriage is slightly lifted. In this position the carriage is pulled with the handle 36 against the first step 67 of the staircase until the rear wheels 14 are in contact with the front of the step 67 and while in contact with it are moved to the position shown in Fig. 4 in which the carrier arms 16 are turned clockwise farther than in Fig. 3 and frame 1 is farther to the right relative to the axle 12. At the same time the support levers 15 are moved by the links 59 into a substantially vertical position as shown in Fig. 4, whereby the carriage frame is lifted and rolling of the rear wheels up and over the step 67 is assisted. By continuously pulling on the bars 36, the front wheels 13 are brought into engagement with the front surface of the step and while rolling over it cause the levers 15 to return more or less completely to the position shown in Fig. 3, depending on the horizontal extension of the step. At the same time the levers 16 are returned toward their initial position by means of the links 59 and the carriage frame is lifted again because the levers 16 are turned counter-clockwise, whereby rolling of the front wheels 13 up and over the step 67 is assisted. Thereupon the rear wheels 14 come into engagement with the front of the next step 68 and the process described is repeated. When the carriage is moved down a staircase the described movements occur in the opposite succession. As shown, both wheelsets of the carriage are always supported from below, even when moving over a staircase because the U-shaped wheel supports are positively interconnected. Hence the handling of this carriage is substantially facilitated, the transition from step to step taking place without shocks and without the use of a special spring for repressing the rear wheel frame, because the wheels 13, 14 roll simultaneously over the steps regardless of the position of the wheel frames. With the described construction of the linkage connecting the U-shaped wheel frames, the angle through which the rear wheel frame can be moved is at least twice as great as that through which the front wheel frame is moved.

The positive connection of the U-shaped frames 11, 61, 15 and 12, 62, 16 can be effected, instead of by the links 59, by other means, e. g., by toothed segments which are fixed to the pivot pins of the support levers and which are in mesh with each other, or by means of levers, ropes, or the like. The connecting gear shown, which is provided at both longitudinal members of the seat frame, may be provided only on one side or centrally below the seat. When the axles are connected directly to the support levers of the U-shaped frame portions, the carriage may be cushioned by springs arranged between the support levers and the carriage frame.

Though the invention has been described as applied to a baby carriage, it is obvious that it can be used equally well in connection with other carriages of similar capacity, for example, for transporting invalids.

I claim:

1. A baby carriage comprising a main frame, a first lever pivoted to said main frame and having a lower end, a first arm having one end connected with said first lever and having a free end, a bolt member connecting the lower end of said lever and the free end of said arm, a front wheel axle slidable on said bolt member, a spring interposed between said front wheel axle and said arm, a second lever pivoted to said main frame and having a lower end, a second arm having one end connected with said second lever and having a free end, a bolt member connecting the lower end of said second lever and the free end of said second arm, a rear wheel axle slidable on said last mentioned bolt member, a spring interposed between said rear wheel axle and said second arm, and a link member having an end pivoted to one of said levers above its pivotal connection with the main frame and having its other end pivoted to the other of said levers below its pivotal connection with the main frame for affording countermoving of said levers and axles supported thereby.

2. A baby carriage as defined in claim 1, said first arm extending forward and said second arm extending rearward when the carriage is on level ground.

3. A baby carriage or the like comprising a main frame, a front wheel axle, a rear wheel axle, individual support means for said front wheel axle, individual support means for said rear wheel axle, individual pivotal connections between said support means and said main frame, connecting means, a movable connection between said connecting means and said support means for the front wheel axle, said movable connection being farther away from said front wheel axle than the pivotal connection between the support means for the front wheel axle and said main frame, and a movable connection between said connecting means and said support means for the rear wheel axle, said last mentioned movable connection being closer to the rear wheel axle than the pivotal connection between the support means for the rear wheel axle and said main frame.

4. A baby carriage or the like comprising a main frame, a front wheel axle, a rear wheel axle, individual support means for said front wheel axle, individual support means for said rear wheel axle, individual pivotal connections between said support means and said main frame, and connecting means pivoted to the support means for the front wheel axle above the pivotal connection of said support means with the main frame and being pivoted to the support means for the rear wheel axle below the pivotal connection of the last mentioned support means with the main frame.

5. A baby carriage or the like comprising a main frame, a front wheel axle, a rear wheel axle, individual support means for said front wheel axle, individual support means for said rear wheel axle, individual pivotal connections between said support means and said main frame, connecting means pivoted to one of said support means above the pivotal connection of said support means with the main frame and being pivoted to the other support means below the pivotal connection of said other support means with the main frame, and an abutment on said main frame adapted to be abutted by one of said support means for limiting the extent of movement thereof.

6. A baby carriage as defined in claim 3, said support means having a substantially U-shaped configuration, the legs of the U forming levers pivotally connected with said main frame by said pivotal connections and the bottom of the U being formed by a member which is substantially parallel to the respective wheel axle and connected with the lower ends of said levers.

HEINRICH MIKLOS.

References Cited in the file of this patent

UNITED STATES PATENTS

| Number | Name | Date |
|---|---|---|
| 1,785,646 | Pascoo | Dec. 16, 1930 |
| 2,525,924 | Margiloff | Oct. 17, 1950 |